United States Patent [19]

Sharples

[11] Patent Number: 4,955,512
[45] Date of Patent: Sep. 11, 1990

[54] LIQUID CONTAINER AND DISPENSER FOR CONTROLLED LIQUID DISPENSATION

[75] Inventor: Leonard Sharples, Scarborough, England

[73] Assignee: Splicerite Limited, West Yorkshire, England

[21] Appl. No.: 301,158

[22] Filed: Jan. 23, 1989

Related U.S. Application Data

[63] Continuation of Ser. No. 147,257, Jan. 22, 1988, abandoned, which is a continuation-in-part of Ser. No. 78,178, Apr. 16, 1987, abandoned.

[30] Foreign Application Priority Data

Jan. 22, 1987 [GB] United Kingdom ................ 8701390
Jul. 24, 1987 [GB] United Kingdom ................ 8717605

[51] Int. Cl.$^5$ ............................................. B67D 5/42
[52] U.S. Cl. .................................. 222/386.5; 222/212; 222/387
[58] Field of Search ............... 222/105, 131, 183, 212, 222/213, 215, 388, 386.5, 400.7, 387

[56] References Cited

U.S. PATENT DOCUMENTS

| | | | |
|---|---|---|---|
| 2,966,282 | 12/1960 | Geisler | 222/183 |
| 3,377,766 | 4/1968 | Nelson | 220/465 X |
| 3,468,308 | 9/1969 | Bierman | 222/212 X |
| 3,486,539 | 12/1969 | Jacuzzi | 222/386.5 X |
| 3,545,475 | 12/1970 | Johnson | 222/400.7 X |
| 3,722,756 | 3/1973 | Cramer, Jr. | 222/212 |
| 4,256,150 | 3/1981 | Möckesch | 222/386.5 X |
| 4,458,830 | 7/1984 | Werding | 222/386.5 X |

FOREIGN PATENT DOCUMENTS

1171612 11/1969 United Kingdom.

Primary Examiner—Kevin P. Shaver
Attorney, Agent, or Firm—Bell, Seltzer, Park & Gibson

[57] ABSTRACT

This liquid container and dispenser includes a rigid or semi-rigid housing 3, a charging and discharging opening defined by a mouth 3a of the housing for permitting the passage of liquid content into or out of the container, a flexible and open-ended bag 2 suspended from the housing opening, and valve structure 4, 5, 5a, 6 for controlling the charging and discharging of the liquid content of the bag 2 via the opening. The bag 2 is made of an elastomeric material and is of sufficient wall strength to expand without rupture within the confines of the housing 3 from a relaxed contracted state 2a upon charging of the bag with liquid, and is returnable to its contracted state by its own inherent resilience in order to discharge its liquid content. To facilitate the contraction of the flexible bag 2, a pressure control valve 8 communicates with the internal space 3b defined between the exterior of the bag 2 and the internal wall of the housing 3, the control valve 8 being operable to allow ingress of ambient air to the internal space 3b as the bag 2 contracts during liquid discharge.

10 Claims, 5 Drawing Sheets

LIQUID CONTAINER AND DISPENSER FOR CONTROLLED LIQUID DISPENSATION

The present invention relates to a liquid container, and particularly, though not exclusively, to a liquid container which will hereinafter be referred to as "bag in a tube" container.

As used herein, the term "bag in a tube" container refers to a container in the form of a flexible inner bag located within a more rigid vessel, such as a tubular vessel. Although reference is made herein to a bag in a tube container, it should be appreciated that the outer vessel can be of any suitable shape, including tubular.

Typically, such a container is used for holding liquids, especially beverages, and has a tap associated with the flexible inner bag so that the liquid may be dispensed.

This type of container may be used for holding both non-pressurized and pressurized liquids, but in the latter case there is a requirement that no space should be left above the partially dispensed liquid into which the gas (normally carbon dioxide) contained in the liquid can escape. Unless this can be achieved, the liquid in the container will go flat.

Currently known containers of this type have a flexible inner bag for holding a pressurized liquid, the bag being contained within a cylindrical outer casing through which a tap associated with the bag projects near the base of the casing, and include means for reducing the volume of the bag as the liquid contained therein is dispensed. For instance, the casing may include upper and lower end caps, the container including a mechanism by which the upper end cap can be moved downwards within the casing to reduce the volume of the bag, this mechanism being lockable against the inner walls of the casing to prevent subsequent increase in the volume of the bag due to the pressure exerted by the liquid.

One of the problems with this type of container is that some pressurized beverages exert very high pressures on the container, and the pressures at which the container can operate successfully are determined primarily by the resistance to increase in volume offered by the locking means provided to prevent such increase.

It is therefore the purpose of the present invention to provide a container which overcomes the above-mentioned limitation.

According to a first aspect of the invention there is provided a liquid container which comprises a rigid or semi-rigid housing, a charging and a discharging opening provided on the housing for the liquid content of the container, a flexible and open-ended bag arranged in the housing to communicate with said housing opening, and a cap assembly mounted on said housing opening and having valve means for controlling the charging and discharging of the liquid content of the bag via said opening, in which:

the bag is made of an elastomeric material and is of sufficient wall strength to expand without rupture within the confines of the housing from a relaxed contracted state upon charging of the bag with liquid, and is returnable to its contracted state by its own inherent resilience in order to discharge its liquid content; and a pressure control valve is provided on the container and communicates with the internal space defined between the exterior of the bag and the internal wall of the housing, said control valve being operable to allow controlled ingress of ambient air to the internal space as the bag contracts so as to control liquid discharge from the container.

According to a further aspect of the invention there is provided a liquid container which comprises a rigid or semi-rigid housing, a charging and discharging opening provided on the housing for the liquid content of the container, a flexible and open-ended bag arranged in the housing to communicate with the housing opening, and a cap assembly mounted on said housing opening and having valve means for controlling the charging and discharging of the liquid content of the bag via said opening, in which:

the bag is made of an elastomeric material and is of sufficient wall strength to expand without rupture within the confines of the housing from a relaxed contracted state upon charging of the bag with liquid, and is returnable to its contracted state by its own inherent resilience in order to discharge its liquid content; and a pressure control valve is mounted on the cap assembly and communicates with the internal space defined between the exterior of the bag and the internal wall of the housing, said control valve being operable to allow ingress of ambient air to the internal space as the bag contracts so as to control liquid discharge from the container.

Thus, in order to charge the container with liquid it is necessary to operate said valve means in a charging mode so that liquid, usually under pressure, can fill the bag via said housing opening, and the valve means is then operated in a closing mode so that the liquid is retained in the bag. During filling of the bag, it expands from its relaxed state and progressively diminishes the volume of the internal space defined between the bag and the inner wall of the housing. Means is provided to permit this expansion of the bag, by arranging for the internal space to be vented. In one arrangement this may be achieved by operating the pressure control valve so that this space can be vented. In another arrangement, a venting aperture is provided on the cap assembly, and this is maintained open to atmosphere during filling of the bag. Thereafter, the pressure control valve may be mounted on the venting aperture, so as to control liquid discharge of the bag as it contracts. In order to discharge all or part of the liquid content of the bag, the valve means is operated in a discharging mode, and the bag automatically discharges its liquid content through the housing opening as it contracts with its own pre-stored elasticity, and under the control of the pressure control valve.

In a preferred arrangement, the valve means is provided on a tap-like fitting which is mounted on or in the housing opening, and this fitting is provided with an intake port to which a liquid dispenser can be coupled, the port having a respective valve element which is normally maintained closed but which is automatically opened upon coupling of the dispenser with the intake port to allow the bag to be charged with liquid, but which then re-closes and remains this way for the life of the container or until recharging takes place. The fitting also has an outlet port or tap, having a one-way valve element which is operable when liquid discharge is required, but which prevents air from entering the container.

A particularly preferred use of the container is for containing beverages, in which case the bag will be made of an elastomeric material which is of food grade and suitable for use with beverages. Further, when the container is intended for use with a carbonated beverage the bag will be made of an elastomer which has a very high gaseous carbon dioxide retention property. Alternatively, and preferably in addition, the elastomer will have the property of having a very low permeability to gaseous oxygen. When beer is stored, it is most important that contact between the beer and gaseous oxygen should be avoided during storage prior to initial opening, and thereafter should be kept to an absolute minimum, since beer quickly deteriorates upon contact with oxygen.

The elastomer from which the flexible bag is made is preferably one which permits the bag to be expanded from its relaxed contracted state, to between 200 and 1,200 percent of its contracted state. In this preferred range, it is particularly suitable for the bag to be capable of being expanded to at least 500 percent of its contracted state. One example of a suitable elastomer from which the bag can be made is a suitably treated polyurethane material.

Preferable the flexible bag is suspended from the housing opening, the bag having a lip which is trapped between the mouth of the housing opening and an engaging portion of the fitting, thereby to form a seal for the flexible bag in the housing.

The housing which is rigid or semi-rigid, may be made of any suitable material or composite, and may be made of metal, glass, paper, or plastics.

The present invention will now be described in detail, by way of example only, with reference to the accompanying drawings, in which.

Figure 1:
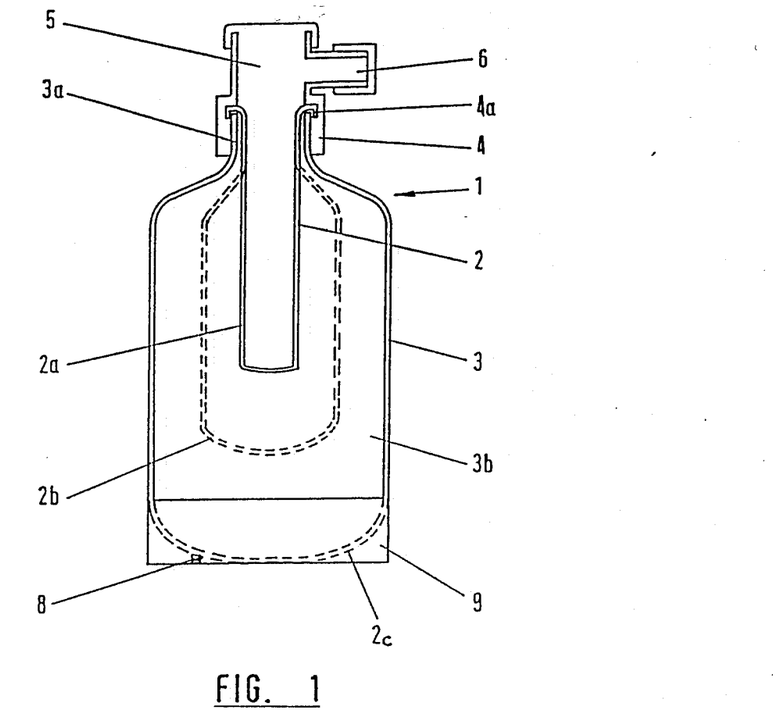
FIG. 1 is a longitudinal section of an embodiment of container according to the invention in which an expandable beverage-containing bag is mounted.

Referring to FIG. 1 of the accompanying drawings, there will be described a first embodiment of liquid container according to the invention, and which comprises a flexible and open-ended inner bag 2 located within an outer housing 3. The housing 3 is formed with a mouth 3a which defines a charging discharging opening via which the liquid content of the container can pass during charging and discharging of the container. As will be described in more detail below, the bag 2 is suspended within the housing 3 via its open end and on the mouth 3a.

The bag 2 is made from an elastomeric material of food grade, suitable for use with beverages, and capable of being expanded between 200 percent and 1,200 percent of its original contracted (relaxed) dimensions, as shown in full lines in FIG. 1. An example of such a material is suitably treated polyurethane.

The bag 2 has a closed lower end, and is of tubular form prior to filling with liquid. The upper end of the bag 2 has a lip 4a which is trapped between the annular end surface of the mouth 3a and a cap 4. The outer housing 3 and the cap 4 are both screw threaded so that the cap 4 can be screwed onto the housing 3, trapping the bag 2 between the cap 4 and the housing 3. The cap 4 includes an outlet tap 6 through which liquid may be dispensed.

The cap 4 also includes a liquid inlet 5 through which the bag 2 may be filled with liquid. When the cap 4 is screwed onto the housing 3, a seal is formed between the cap 4 and the outer housing 3. Thus, the cap 4 forms a tap-like fitting which can be mounted on or in the opening in the housing 3.

The outer housing 3, which is rigid or semi-rigid, may be made of metal, glass, paper, plastics, or any other suitable material or composite. The tap 6 may be moulded from plastics material with a metal or plastics cap.

In use, the container is filled via the liquid inlet 5 which forms an intake port to which a liquid dispenser can be coupled, the port having a respective valve element 5a (see FIG. 3) which is normally maintained closed but which is automatically opened upon coupling of the dispenser (not shown) with the intake port to allow the bag 2 to be charged with liquid. However, the valve element 5a automatically re-closes and remains this way for the life of the container after charging or until re-charging.

As an alternative to charging via the liquid inlet 5, the container may also be filled with liquid through the tap 6.

Prior to filling of the container with liquid the bag 2 is contracted and takes a relaxed tubular state, as shown by reference 2a in full lines in FIG. 1. As the bag 2 becomes filled with liquid to more than its minimum contracted volume, it expands so that when the container is approximately half full, the bag assumes the position indicated by dashed lines 2b. When the container is completely full of liquid, the bag takes up the position indicated by 2c, in which it fills all of the space available within the outer housing 3 and presses intimately against its wall.

Then, as the liquid is dispensed through the tap 6, the bag 2 contracts by an amount approximately equivalent to the volume of liquid dispensed, thus ensuring that no air space is left above the liquid remaining in the bag 2.

Accordingly, the valve element 5a, and the tap 6 jointly constitute a "valve means" for controlling the charging and discharging of the liquid content of the bag 2 via the opening defined by the mouth 3a of the housing 3. Furthermore, the bag 2 is made of an elastomeric material and is made so as to have sufficient wall strength to expand without rupture within the confines of the housing 3 from a relaxed contracted state upon charging of the bag with liquid, and is returnable to its contracted state by its own inherent resilience (pre-stored elasticity) in order to discharge its liquid content. However, to facilitate the expansion of the bag 2 during liquid charging, and its contraction during liquid discharge, a pressure control valve (which is described in more detail below) communicates with the internal space 3b which is defined between the exterior of the bag 2 and the internal wall of the housing 3.

The pressure control valve will be located at any convenient position in the wall of the housing 3, and is shown by way of example only, schematically as pressure control valve 8 which is mounted in the base 9 of the housing 3. The pressure control valve 8 is arranged to be capable of operation, manually or automatically as desired, to allow venting of the internal space 3b during expansion of the bag 2 as it is charged with liquid. This therefore allows the bag to expand without significant pressure resistance during liquid filling. The pressure control valve 8 is mounted in the base 9 and may be arranged to be triggered automatically to an open position upon placement of the base 9 on a suitable support during liquid filling of the container in a factory. However, upon removal of the housing 3 from this special support, the valve 8 returns to its normal position, in which it can function as a one-way valve which only permits throttled ingress of external ambient air to the internal space 3b when there is a pressure differential in this direction ie when sub-atmospheric pressure is generated in the internal space 3b during contraction of the bag 2. The valve 8 is a throttle valve which slowly allows the internal space 3b to be charged with air as the bag 2 contracts thereby preventing excessive liquid discharge from the bag 2 upon opening of the tap 6.

As indicated above, the flexible bag 2 is made of an elastomeric material of food grade, and capable of expanding by up to 1,200 percent of its relaxed state. For beverage use, the elastomeric material will be a specially treated material which has special properties in relation to its operation when exposed to gaseous oxygen and gaseous carbon dioxide. Thus, when beer is stored within the bag 2, it is important to prevent access of gaseous oxygen to the beer, during storage prior to initial use, and to minimize any contact with oxygen after first use. It is well known that gaseous oxygen contact with beer rapidly results in deterioration of the beer. Therefore, the elastomer should have the property of having very low permeability to gaseous oxygen. Evidently, when the container is fully charged with beer, the bag 2 will be expanded so that it totally and intimately contacts the housing 3 throughout its internal wall surface, so that there is no chance of gaseous oxygen coming into contact with the beer. However, during progressive contraction of the bag 2, there will be ingress of ambient air into the internal space 3b, and it is therefore important to minimize the extent of any gaseous migration through the wall of the bag 2 and into contact with the beer. Clearly, the greater the extent of minimising gaseous oxygen migration, the greater will be the acceptable storage life of a beer container following initial opening. A typical wall thickness of the bag 2 may be about 2 mm when beer is stored in the bag, and about 3 mm for a carbonated beverage.

In addition to the property of low gaseous oxygen permeability, when a carbonated beverage is stored within the bag 2, it is important to minimize loss of gaseous carbon dioxide. Therefore, desirably the elastomer should have the property of a very high gaseous carbon dioxide retention.

The bag 2 may be provided with longitudinally extending ribs extending outwardly from the outer surface of the bag. These ribs are provided in order to ensure that air passageways, between adjacent ribs, allow air to flow from around the bottom of the bag towards the neck region of the bag. The bag typically will expand outwardly from the top towards the bottom, the top of the bag engaging the wall of the casing before the bottom of the bag has fully expanded. Without the provision of these ribs there is a danger that air may be trapped between the bottom of the bag and the housing 3. At its neck region, the bag is provided with an annular groove which is in communication with the passageways formed between the ribs and this annular groove in turn communicates with a valve (not shown, but corresponding in function to valve 8) which may be actuated to allow escape of air from between the bag and the casing to the exterior of the device. The arrangement may be such that the valve may be manually or automatically actuated. Automatic actuation would take place when a filling head is connected to the device and allows evacuation of air while the bag is being filled. The valve is such that, as liquid is emptied from the device, the drop in pressure between the bag and the casing will cause the valve to open and allow air to be sucked into the space between the bag and the casing.

Figure 2:
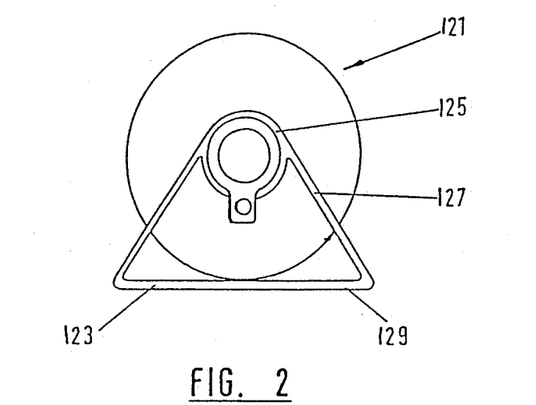
FIG. 2 is an end view of a similar container to that shown in FIG. 1, but fitted with a combined carrying handle and "anti-roll bar"

Referring to FIG. 2 of the accompanying drawings, a container 121 is essentially similar to the container of FIG. 1 but is fitted with a removable carrying handle 123. Handle 123 includes a collar 125 extending around the neck of the container, arms 127 made of relatively thin, flexible plastics material, and grip portion 129 formed of larger section material. In its "rest" position, handle 123 extends laterally from the container neck and when the container is on its side for dispensing purposes, the handle acts as an "anti-roll" bar, as illustrated in FIG. 2. However, because of the flexibility of arms 127, the handle will "bend" so that grip portion lies above the valve when the container is being carried in a vertical orientation by means of the handle.

In an alternative embodiment, the handle may be formed integrally with the container.

It should be appreciated that the container may be used equally successfully with pressurized or non-pressurized liquids.

Figure 3:
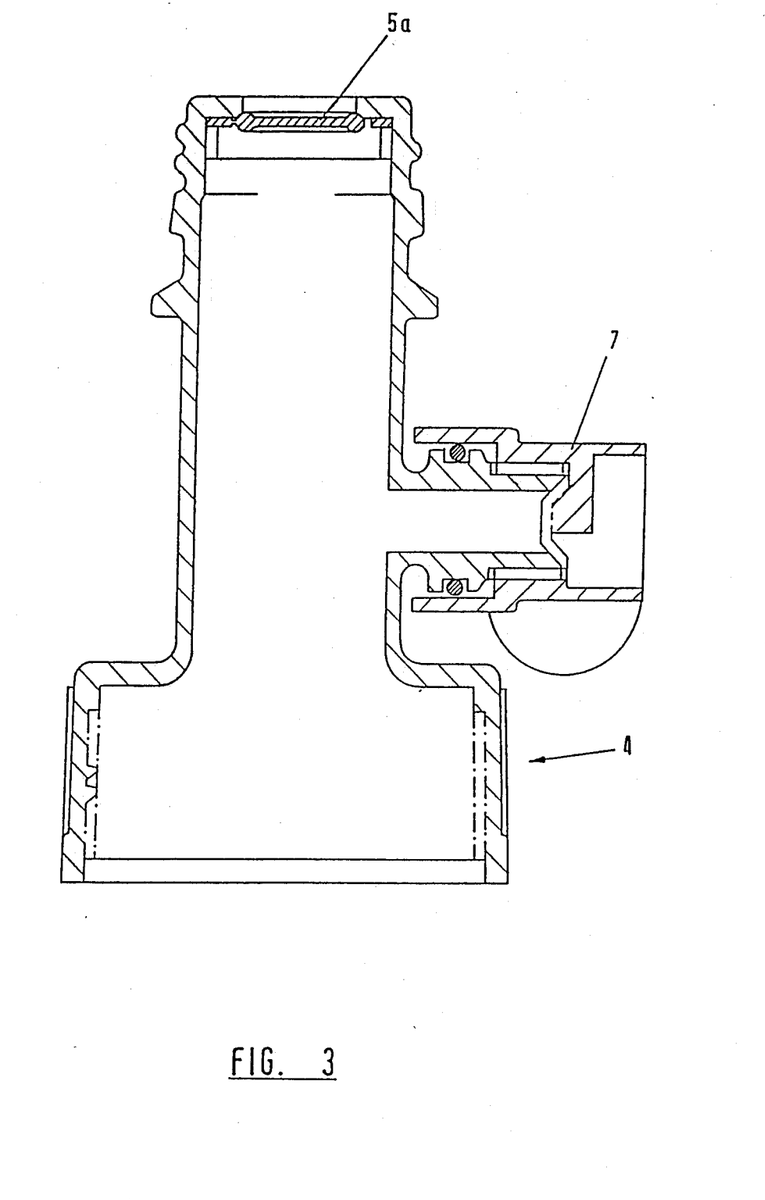
FIG. 3 is a detailed view of a tap-like fitting for mounting in a housing opening of the container shown in FIG. 1.
Figure 4:
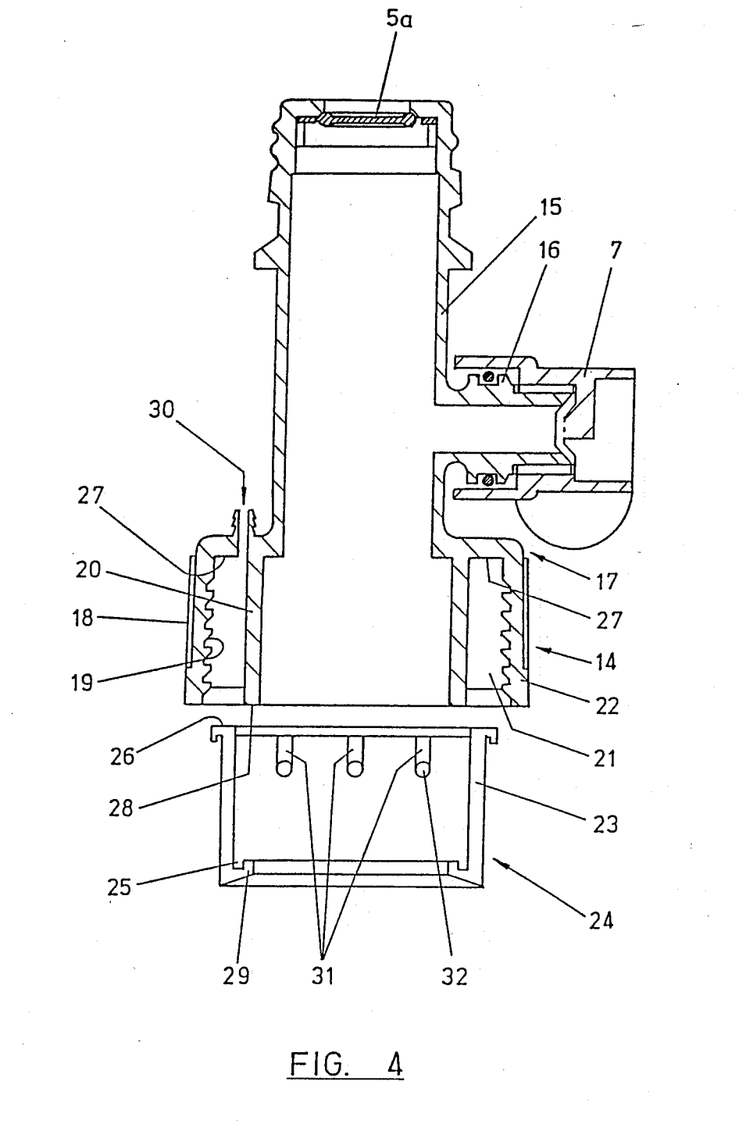
FIG. 4 is an exploded view of a first embodiment of cap assembly for mounting on the container shown in FIG. 1.

Referring now to FIG. 4 of the drawings, a first embodiment of cap assembly according to the invention is designated generally by reference 14, and is intended to be mounted threadedly on the exterior of the mouth 3a of the container 1, the assembly 14 being generally similar to the cap 4 of FIG. 3 and having corresponding parts designated by the same reference numerals and which parts will therefore not be described in detail again.

The cap assembly 14 has a projecting stub 15 which is provided, at its free end, with the releasable valve element 5a. The cap assembly 14 also has a lateral projection 16 on which a rotatable tap element 7 is mounted. The cap assembly 14 also has a cup-shaped portion 17 provided with external flats 18 to facilitate rotary manipulation of the cap assembly, and an internal screw thread 19 by means of which the cap assembly 14 can be threadedly engaged with an external screw thread on the mouth 3a of the container 1.

The cup shaped portion 17 includes an annular wall portion 20 which forms a prolongation of the projecting stub 15 with which it forms a common passage during liquid charging, but forms part of an outlet passage, with the projecting stub 16, upon liquid discharge following operation of the control tap 7. An annular chamber 21 is defined between the annular wall portion 20 and the circumferential skirt 22 of the cap assembly 14, and this chamber 21 receives the mouth 3a of the container 1 (not shown in FIG. 4) during assembly of the cap assembly 14 on the container 1.

However, this annular space 21 also serves to accommodate an annular wall 23 of a retaining fitting 24 which serves to hold the lip 4a of the bag 2 upon assembly of the fitting 24 with the cap assembly 14. The fitting 24 includes an annular groove 25 into which is fitted a peripheral bead forming the lip surrounding the mouth of the bag 2.

The fitting 24 is generally cylindrical, and the annular upper end 26 of the wall 23 moves into abutment with an upper annular surface 27 of the chamber 21. Upon assembly of the fitting 24 in the chamber 21, with the lip 4a of the bag 2 retained in the groove 25, the bag becomes firmly retained in position by engagement of the annular lower end 28 of wall 20 with the material of the bag which is thereby gripped between end 28 and an annular shoulder 29 which defines the groove 25.

A venting aperture 30 is provided on the cap assembly 14 and communicates with the annular space 21 and, for a purpose which will be described below, aperture 30 is maintained open to atmosphere during filling of the bag. Thereafter, pressure control valve 8 (shown in exploded view in FIG. 5) is mounted on the venting aperture 30, so as to control liquid discharge of the bag as it contracts. During liquid charging of the bag, with the venting aperture 30 maintained open, communication is established between atmosphere and the space defined within the container 1 between the outer surface of the bag 2 and the inner wall of the container, via the annular space 21 and the venting aperture 30, and also via communicating passages provided in the annular wall 23 of the fitting 24.

To establish this communication with atmosphere, a number of axially extending passages 31 are provided in the wall 23, and these communicate at their lower ends 32 with the annular space 21, and at their upper ends communicate with the venting aperture 30.

Figure 5:
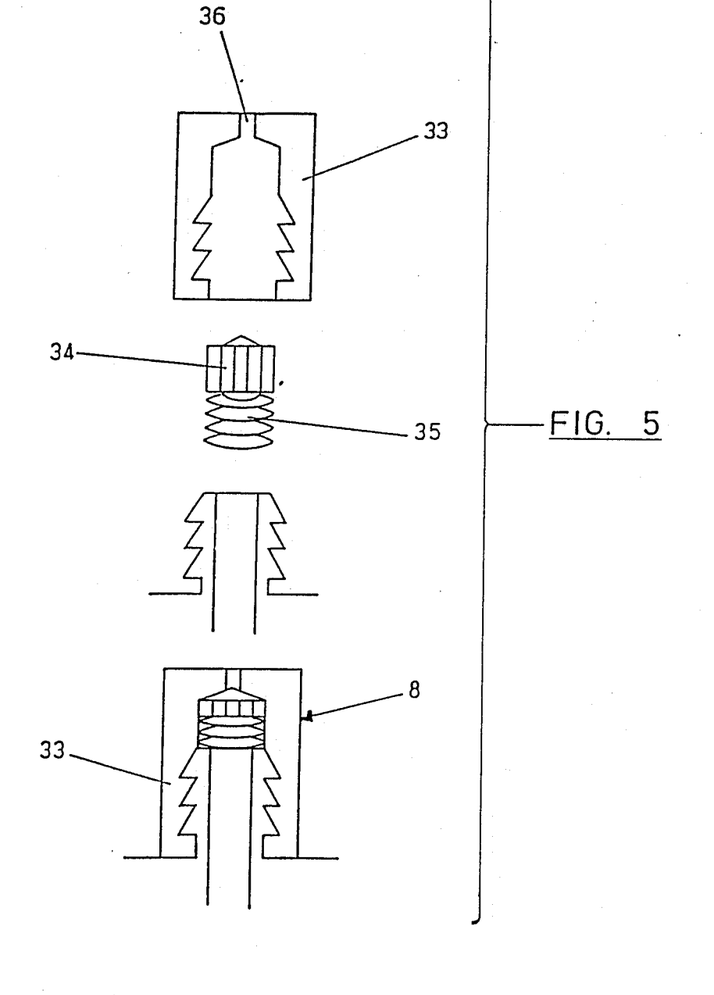
FIG. 5 is an exploded view of a throttle valve to be mounted an apertured fitting on the cap assembly of FIG. 4; and, FIG. 6 is an exploded view of a second embodiment of cap assembly.

Following liquid charging of the bag, the pressure control valve 8 is threadedly mounted on the venting aperture 30, the valve 8 being made up of three component parts, namely an internally threaded outer body 33, a valve element 34 and a compression spring 35. The valve 8 comprises a throttle valve, and it will be noted that the body 33 defines a restricted outlet 36, and the valve element 34 is normally biased to a closed position over the outlet 36 by the compression spring 35. However, during liquid discharge, as the bag contracts following opening of the tap 7, this will create negative pressure within the container 1 between the outer wall of the bag 2 and the inner wall of the container, and this is conveyed to the annular space 21, and thereby exerts a downward force on the valve element 34 against its spring biasing, thereby uncovering the throttled inlet 36, so as to admit a controlled flow of ambient air to the container 1. The parameters of the operating components of the container, and especially the throttle valve, are set such that controlled dispensing of liquid takes place without risk of any excess foaming of the liquid e.g. beer occurring. Thus, the throttle valve 8 opens when a predetermined pressure differential occurs between atmosphere and the interspace between the bag and the container, whereby the bag dispenses its product at a uniform rate.

When the tap or valve 7 is turned off, the remaining product in the bag will attempt to give off carbon dioxide, when it is beer or a carbonated beverage, and thereby exert a pressure on the bag. However, by this time the valve 8 will be closed, by the biasing of the spring 35 acting on the valve element 34, and therefore the bag will be assisted in its pressure retention by the fact that the surrounding interspace within the container 1 is now maintained substantially airtight.

As indicated above, it will normally be preferable for the venting aperture 30 to be maintained open during liquid charging, and for the pressure control valve to be applied subsequently. However, this is not essential to the invention, and the pressure control valve may be arranged to be mounted in position, and to have its operation temporarily controlled so that venting to atmosphere can readily take place during liquid charging of the bag.

Although not shown in FIG. 4 of the drawings, it may be necessary in certain circumstances e.g. in the storing and dispensing of high carbonation liquids, to provide some means to control excessive pressure and foaming in the discharge of the liquid contents from the rotatable tap element 7. Conveniently, this means may comprise a suitable restriction provided in the flow passage to the tap element 7, whereby suitable control can be exercised over the liquid flow, thereby to control excessive pressure and foaming in the discharge from the fitting.

Figure 6:
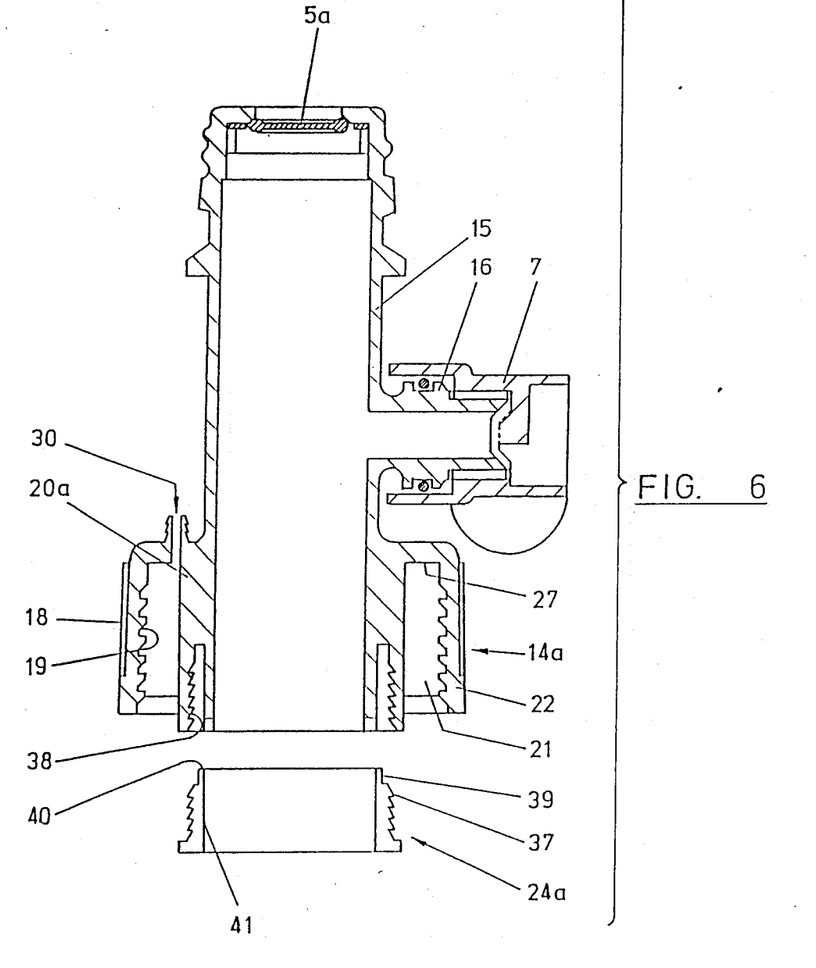

Referring now to FIG. 6 of the drawings, a second embodiment of cap assembly according to the invention is shown, which is adapted to be mounted threadedly on the upper end of a container, similar to the embodiment of FIG. 4. This embodiment is designated by reference 14a, and parts corresponding exactly with the embodiment of FIG. 4 are designated by the same reference numerals, but parts which differ are designated by the same reference numerals, but with the addition of the letter a. In this embodiment, an alternative construction of fitting 24a is provided, in order to retain the mouth end of the bag in position. The fitting 24a has an external engaging formation 37, which engages with a matching formation 38 provided internally within the annular wall 20a. The formations 37 and 38 may be cooperative threaded formations, or may be snap-fitting saw-tooth arrangements. The beaded lip of the bag (not shown) will be engaged on an annular step 39 of the formation 37, with the remainder of the bag being taken over the upper end 40 of the fitting 24a, and then downwardly alongside the cylindrical inner wall 41.

The mouth 3a of the container 3 is then threaded into engagement with the internal thread 19 and occupies the annular space 21, to complete the assembly.

In this embodiment, there is direct communication between external atmosphere and the internal space of the container 1 via the annular space 21 during liquid charging (when the valve 8 is normally unattached to the venting aperture 30). During liquid discharge, there will be controlled ingress of ambient air, in the same way as described above for the embodiment of FIG. 4.

I claim:
1. A liquid container which comprises:
 (a) a housing;
 (b) a charging and discharging opening provided on the housing for the liquid content of the container;
 (c) a flexible and open-ended bag arranged in the housing to communicate with said housing opening and defining an internal space within the container between the exterior of the bag and an internal wall of the housing; and,
   (i) the bag being made of an elastomeric material and being of sufficient wall strength: to expand without rupture within the confines of the housing from a relaxed contracted state upon charging of the bag with liquid, and be returnable to its contracted state by its own inherent resilience in order to discharge its liquid content;
 (d) valve means for controlling the charging and discharging of the liquid content of the bag via said opening; and,

(e) a pressure control valve communicating with the internal space defined between the exterior of the bag and the internal wall of the housing, said control valve allowing ingress of ambient air to the internal space as the bag contracts during liquid discharge, said control valve comprising an outer body having a restricted outlet for flow of air therethrough to atmosphere, a valve element positioned within said outer body immediately adjacent said restricted outlet, and spring means positioned in engagement with said valve element remote from said restricted opening and resiliently urging said valve element outwardly into sealing relation to said restricted opening whereby upon a predetermined negative pressure being created in the internal space defined between the exterior of the bag and the internal wall of the housing as the bag contracts during liquid discharge, said valve element will be moved to a non sealing position by atmospheric pressure thereon overriding said spring means.

2. A liquid container according to claim 1, wherein the bag is made of an elastomeric material which is expandable to at least 200 percent of its relaxed state.

3. A liquid container according to claim 1 in which the elastomeric material is made of a food grade material suitable for use with beverages, and has very low permeability to gaseous oxygen.

4. A liquid container according to claim 1 in which the elastomeric material is of a food grade material suitable for use with beverages, and has the property of very high retention of gaseous carbon dioxide.

5. A liquid container according to claim 1 further comprising means for overriding operation of said pressure control valve so that the internal space between the bag and the housing can be vented to atmosphere during expansion of the flexible bag when the latter is being filled with liquid.

6. A liquid container according to claim 1 in which the housing is made of material selected from the group comprising: metal, glass, paper, plastic and composites thereof.

7. A liquid container according to claim 1 in which the open end of the bag is suspended from a mouth of the housing which defines said housing opening.

8. A liquid container according to claim 1 in which the valve means is provided on a tap-like fitting which is mounted on the housing opening, said fitting being provided with an intake port to which a liquid dispenser can be coupled, said value means having a normally closed valve element which is automatically opened upon coupling of the dispenser with the intake port to allow the bag to be charged with liquid.

9. A liquid container according to claim 8, in which the fitting has an outlet port, and said valve means further includes a one-way valve element in said outlet port which is operable when liquid discharge is required.

10. A liquid container which comprises:
(a) an upright housing;
(b) said housing having a reduced upper end portion provided with a mouth defining a charging and discharging opening for the liquid content of the container;
(c) a flexible and open-ended bag uprightly and suspendingly arranged in the housing and communicating with said housing opening and defining an internal space within the container between the exterior of the bag and an internal wall of the housing; and,
  (i) the bag being made of an elastomeric material and being of sufficient wall strength: to expand without rupture within the confines of the housing from a relaxed contracted state upon charging of the bag with liquid, and be returnable to its contracted state by its own inherent resilience in order to discharge its liquid content;
(d) valve means mounted on said reduced upper end portion of said housing for controlling the charging and discharging of the liquid content of the bag via said opening, said valve means including means defining a liquid inlet positioned above said opening, a normally closed valve element positioned in said inlet, an outlet tap disposed laterally of said liquid inlet and communicating therewith for discharging of the liquid content of said bag; and,
(e) a pressure control valve communicating with the internal space defined between the exterior of the bag and the internal wall of the housing, said control valve allowing ingress of ambient air to the internal space as the bag contracts during liquid discharge, said control valve comprising an outer body having a restricted outlet for flow of air therethrough to atmosphere, a valve element positioned within said outer body immediately adjacent said restricted outlet, and spring means positioned in engagement with said valve element remote from said restricted opening and resiliently urging said valve element outwardly into sealing relation to said restricted opening whereby upon a predetermined negative pressure being created in the internal space defined between the exterior of the bag and the internal wall of the housing as the bag contracts during liquid discharge, said valve element will be moved to a non sealing position by atmospheric pressure thereon overriding said spring means.

* * * * *

UNITED STATES PATENT AND TRADEMARK OFFICE
CERTIFICATE OF CORRECTION

PATENT NO. : 4,955,512

DATED : September 11, 1990

INVENTOR(S) : Leonard Sharples

It is certified that error appears in the above-identified patent and that said Letters Patent is hereby corrected as shown below:

Column 1, line 5, before the word "The" insert -- This is a continuation of U.S. application Serial No. 147,257, filed January 22, 1988, now abandoned, which is a continuation-in-part of U.S. application Serial No. 078,178, filed April 16, 1987, now abandoned. --

Column 3, line 54, after the word "charging" insert -- and a --.

Signed and Sealed this

Twenty-fourth Day of December, 1991

Attest:

HARRY F. MANBECK, JR.

*Attesting Officer*  *Commissioner of Patents and Trademarks*